(12) United States Patent
McKinlay

(10) Patent No.: US 8,506,223 B2
(45) Date of Patent: Aug. 13, 2013

(54) LOW-PROFILE CAM LOCKING THREADED FASTENER

(76) Inventor: Alistair Neil McKinlay, Culver City, CA (US)

( * ) Notice: Subject to any disclaimer, the term of this patent is extended or adjusted under 35 U.S.C. 154(b) by 589 days.

(21) Appl. No.: 12/541,903

(22) Filed: Aug. 14, 2009

(65) Prior Publication Data

US 2010/0040430 A1 Feb. 18, 2010

Related U.S. Application Data

(60) Provisional application No. 61/088,962, filed on Aug. 14, 2008.

(51) Int. Cl.
  *F16B 39/24* (2006.01)
(52) U.S. Cl.
  USPC ........... 411/147; 411/149; 411/432; 411/533; 411/538
(58) Field of Classification Search
  USPC ............. 411/134, 136, 147, 149, 173, 432, 411/533, 538, 366.1
  See application file for complete search history.

(56) References Cited

U.S. PATENT DOCUMENTS

| | | | |
|---|---|---|---|
| 3,263,727 A | | 8/1966 | Herpolsheimer |
| 3,417,802 A | | 12/1968 | Oldenkott |
| 4,362,449 A | * | 12/1982 | Hlinsky .......................... 411/156 |
| 4,971,498 A | * | 11/1990 | Goforthe ....................... 411/134 |
| 5,090,855 A | * | 2/1992 | Terry ............................. 411/144 |
| 5,190,423 A | * | 3/1993 | Ewing ........................... 411/134 |
| 5,203,656 A | * | 4/1993 | McKinlay ..................... 411/149 |
| 5,314,279 A | * | 5/1994 | Ewing ........................... 411/134 |

FOREIGN PATENT DOCUMENTS

CA  1320364 A1  7/1993

OTHER PUBLICATIONS

European Search Report dated Oct. 19, 1989 for European Patent No. 0 350 711 (European counterpart to Canadian Pat. No. 1320364).

* cited by examiner

*Primary Examiner* — Roberta Delisle
(74) *Attorney, Agent, or Firm* — Vincent Re PLLC

(57) ABSTRACT

An low-profile cam locking fastener assembly in which a locking nut is connected to a locking washer through a tubular skirt that extends from the nut opening. The skirt and nut opening are coaxial having contiguous inner surfaces that are threaded to receive a bolt or stud. The washer is mounted to the skirt so as to be rotatable with respect to nut as well as axially movable to a position in which cooperating cam elements on opposing faces between the washer and the nut are separated. The cam elements are arranged so that when the nut and washer are fastened down to a bolt or stud on a workpiece, the cam elements engage one another to substantially prevent the nut from loosening from the threaded bolt/stud.

15 Claims, 5 Drawing Sheets

LOW-PROFILE CAM LOCKING THREADED FASTENER

CROSS-REFERENCE TO RELATED APPLICATION

This application claims priority of U.S. Provisional Patent Application filed Aug. 14, 2008 having Ser. No. 61/088,962.

FIELD OF THE INVENTION

This invention is related to threaded mechanical fasteners and more particularly to locking nuts, wheelnuts, and self-tightening nuts.

BACKGROUND OF THE INVENTION

A variety of cam locking or "self-tightening" fasteners have been disclosed in the prior art. Such fasteners accommodate a workpiece exposed to vibration. Some prior art devices may be found in U.S. Pat. No. 3,263,727 which issued Aug. 2, 1966 to Arthur B. Herpolsheimer; U.S. Pat. No. 3,417,802 which issued Dec. 24, 1968 to Carl O. Oldenkott; and Canadian Pat. No. 1,320364 which issued Jul. 20, 1993 and to the present inventor and is marketed commercially under the trademark DISC-LOCK.

Such devices usually have one or more washer-shaped pieces having inclined cams on one side and a series of ridges on the other. The washers are mounted so that the cam surfaces will mate. In a typical situation, the washers are mounted on a stud between a nut and the workpiece.

Vibration or shock will cause the stud or bolt to elongate. The nut tends to rotate loose. A cam locking device prevents this since the cam rise angle is greater than the lead angle of the thread on the bolt. As the nut rotates relative to the washer, the preload is actually increased, further locking the nut.

One shortcoming of the prior art and commercially available self-tightening fasteners is that the stacked nut and washer have a combined height which presents a relatively large profile preventing these fasteners from being used in certain situations, e.g. where there is a small fastener clearance dimension.

In my prior invention, the self-tightening fastener's washer is captured by an integral skirt that extends from the bottom of the nut. To date, this skirt has always had a thin wall construction to facilitate a swaging operation which flares over the lower end to retain the washer. This thin wall construction, however, is not conducive to threading. Therefore, to provide an adequate number of threads within the fastener, my prior invention had a fastener height to washer diameter ratio of at least 0.54 and more typically about 0.65 (e.g., a height to washer diameter ratio of approximately 0.70 for a ½" fastener). While my prior fastener was adequate for some applications, the relatively high profile prevented its use in other applications.

There was therefore a need for a cam locking fastener having both a captive washer and a low profile.

SUMMARY OF THE INVENTION

The broad purpose of the present invention is to provide an improved fastener assembly having a low-profile in which a locking nut is connected to a locking washer through a tubular skirt that extends from the nut opening. The low profile is achieved by continuing the internal threading from the nut opening down through the coaxial skirt.

In the preferred embodiment, the washer is mounted to the skirt so as to be rotatable with respect to the skirt and nut as well as axially movable to a position in which cooperating cam elements on opposing faces between the washer and the nut are separated. Further, the cam elements are arranged so that when the nut and washer are fastened down a bolt or stud onto a workpiece, the cam elements engage one another to substantially prevent the nut from loosening from the threaded bolt/stud.

It is an advantage of the present disclosure to provide a low-profile cam locking fastener assembly for coacting with an externally threaded member to apply tightening force to a workpiece. The fastener assembly comprising a nut having an internal opening formed about an axis, a bottom cam face that is perpendicular to the axis, and a tubular skirt that projects from the bottom cam face. The skirt has a cylindrical inner bore with an inner surface that is contiguous with the inner surface of the nut's internal opening, wherein these inner surfaces have a continuous threaded profile that is complementary to the threading of the threaded member. The fastener assembly further includes a locking washer having an central opening and an upper cam face, wherein the skirt is telescopically received within the central opening. Camming means are provided on the nut cam face and the washer cam face, for driving both the nut and the locking washer when the nut is rotated in a tightened direction on the threaded member and for wedging the nut in a locked position when it begins to rotate in the direction opposite to the tightened direction.

It is another advantage of the present disclosure that the preferred embodiment provides that the fastener presents a relatively low-profile, where the overall height dimension of the combined nut-and-washer fastener is approximately one-half, but less than 54 percent, of the overall diameter of the washer. To facilitate this low profile, the internal threading of the nut body continues down along the cylindrical inner wall of the tubular skirt extending from the nut.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views and in which.

DETAILED DESCRIPTION OF THE INVENTION

Figure 1:
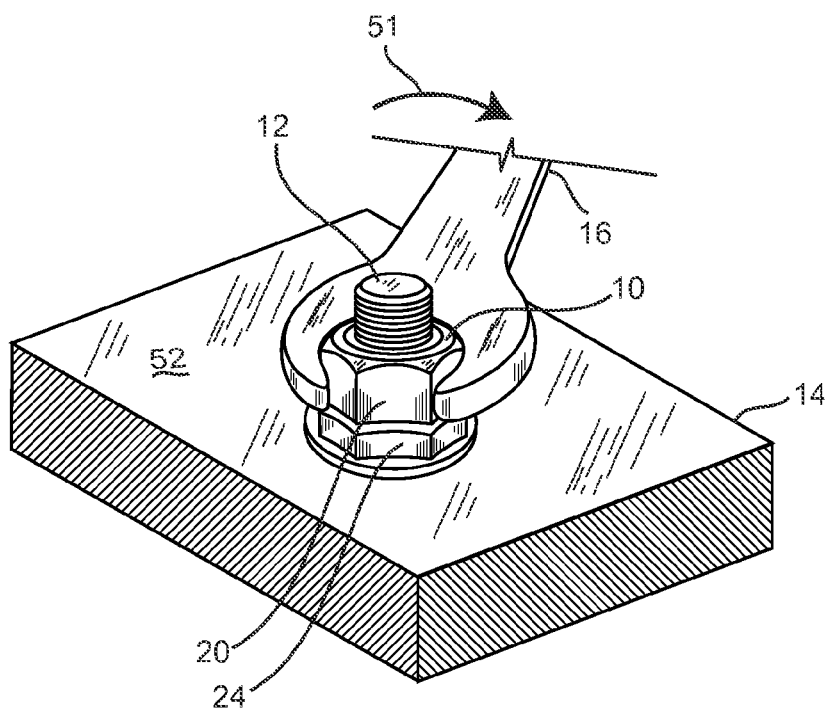
FIG. 1 is a view illustrating a fastener assembly embodying the invention being tightened on a workpiece.

Referring now to the FIGs., a cam locking fastener 10 is mounted on a threaded stud 12 which is secured to a workpiece 14. A wrench 16 is used for tightening the fastener 10 on the stud in the clockwise direction to apply a load on the workpiece. The wrench is rotated in the opposite direction for loosening the fastener means and releasing the load on the workpiece.

Fastener 10 comprises a nut 20 having a tubular skirt 22, and a locking washer 24. Referring to FIGS. 1, 2, 5 and 8, the nut has a six-sided conventional hexagonal external configuration 28 engaged with a conventional nut-receiving opening in wrench 16. Nut 20 has a through opening 30 having an internal threaded surface 30a meshed with the continuous helical thread on stud 12 by application of a wrench 16 to flat multi-sided external surfaces 28. In the preferred embodiment, fastener 10 has a relatively low-profile, where the overall height of the combined nut-and-washer fastener is approximately one-half of the overall diameter of the washer. For the purposes of this disclosure, the terms "low-profile" and/or "low profile" with respect to the cam locking fastener 10 shall be construed to mean having a ratio of the fastener height to the radially outmost diameter of the washer of less than 0.54 (i.e., 54 percent).

As will be described in greater detail below, nut 20 has a lower camming end face 31. End face 31 engages a mating camming end face 32 on washer 24.

Figure 3:
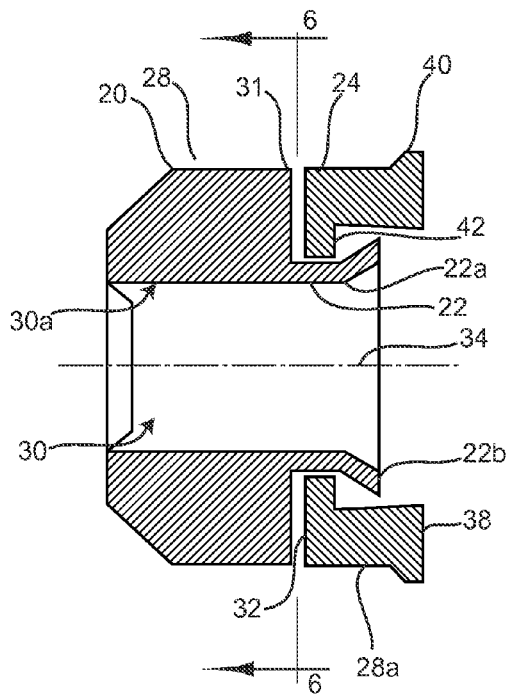
FIG. 3 is a sectional view showing the nut and washer assembly.
Figure 4:
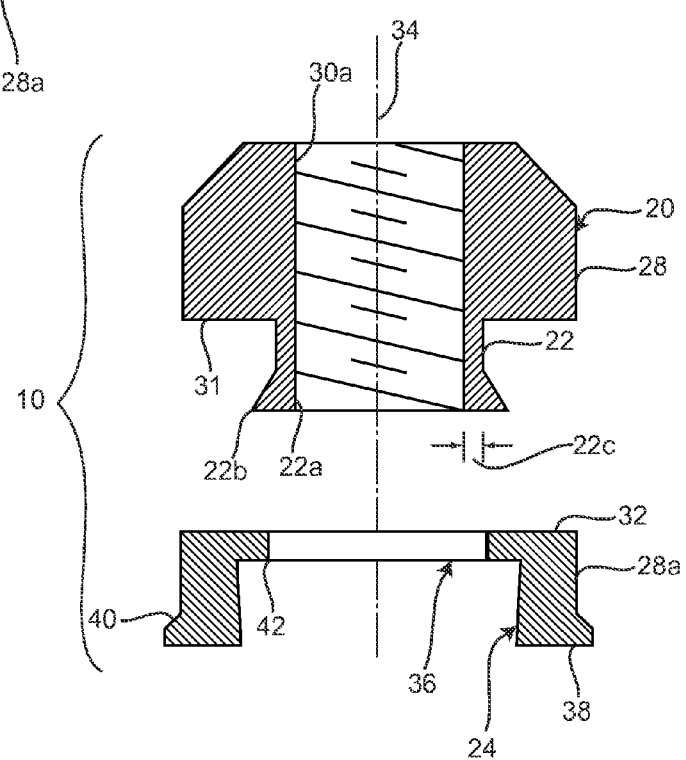
FIG. 4 is a section exploded view showing the nut and washer assembly.
Figure 5:
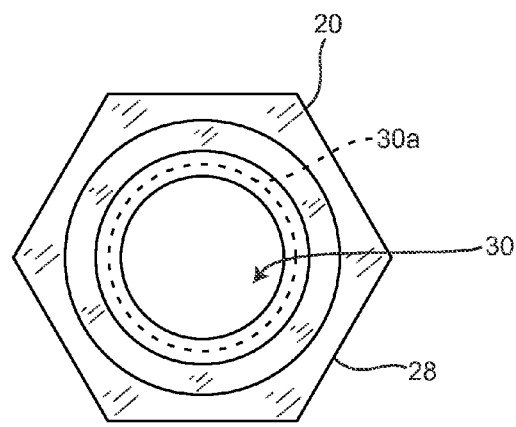
FIG. 5 is a view of the top of the nut.

Skirt 22 has a generally tubular configuration which extends axially along the axis of rotation 34 projecting from the bottom end 31 of the nut. As best shown in FIGS. 3 and 4, the cylindrical inner surface 22a of the skirt is identical in size, shape, and orientation to surface 30a to present a contiguous cylindrical surface. Further, surface 22a receives the same threading as surface 30a, effective to elongate the threaded portion of fastener 10. Thereby allowing for the low-profile height of the fastener 10 while ensuring a proper number of threads intermesh with the threaded stud 12.

The skirt 22 terminates at a flared, annular, outer end 22b. The end 22b can be enlarged or flared by a swaging operation performed after the washer 24 has been placed on the nut skirt 22 to loosely retain the washer 24 to the nut. The maximum external diameter of the skirt is at outer end 22b. The skirt has a minimum external diameter in the region between surface 31 and end 22b. Tubular skirt 22 has sufficient wall thickness 22c to receive the continued internal threading of surface 30a. For example and without limitation, wall thickness 22c may be approximately double the height of a sharp V-thread for the internal thread formed therein (i.e., approximately 1.75 times the pitch of the thread).

FIGS. 4 and 7-9 illustrate washer 24. Washer 24 has an upper camming face 32 which faces toward nut cam face 31. The upper external portion of the washer has a hexagonal configuration 28a, with the same general size and shape as the hexagonal configuration 28 of the nut so that a single wrench 16 can simultaneously engage both the washer and the nut when their hexagonal corners are aligned, one with the other.

The washer has a central opening 36 which is slidably mounted on the cylindrical skirt. The opposite face 38 of the washer is substantially parallel to cam face 32 and forms the lower surface of an annular lip 40 which enlarges the seizing area between the washer and the workpiece. In one non-limiting embodiment (not shown), face 38 has a plurality of equally spaced seizing teeth around the lower face of the washer.

Figure 2:
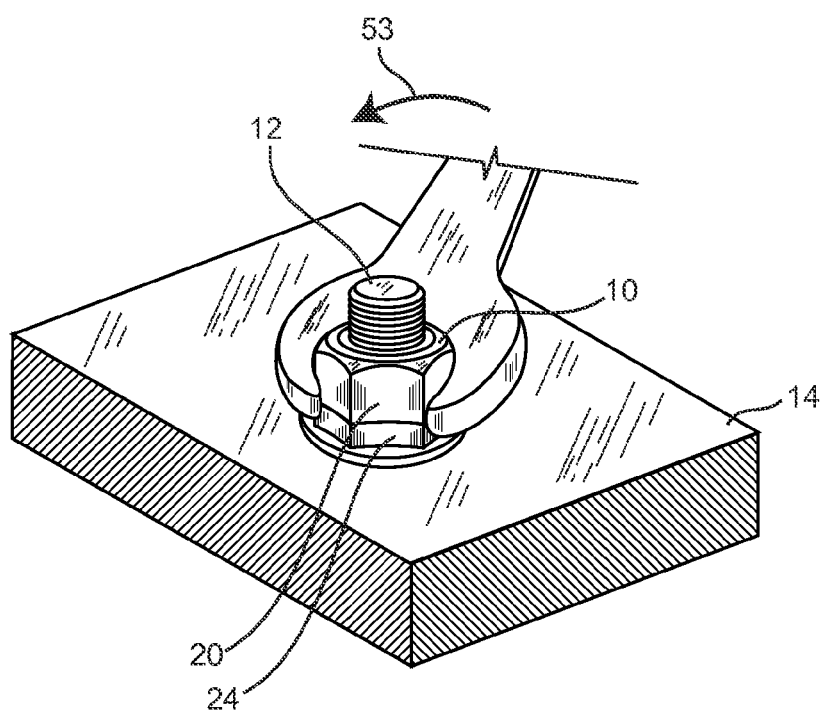
FIG. 2 is a view similar to FIG. 1, but showing a wrench mounted on both the nut and the washer to loosen the assembly from the workpiece.

Referring to FIGS. 3 and 4, opening 36 has a diameter which slidably accommodates the diameter of the skirt 22 but is less than the diameter of end 22b. The diameter of opening 36 is slightly greater than end 22b so that it abuts an annular shoulder 42 when the washer is at the limit of its travel on the skirt. Thus, the washer is moveable toward the nut to an engaged position in which the cam elements on the washer engage the cam elements on the nut. In this position, the nut and the washer may be rotated either in an opposite direction, or together in the same direction, as illustrated in FIGS. 1 and 2. The washer is moveable to a separated position in which the cooperating cam elements clear one another so that the washer can be rotated about the skirt.

Figure 6:
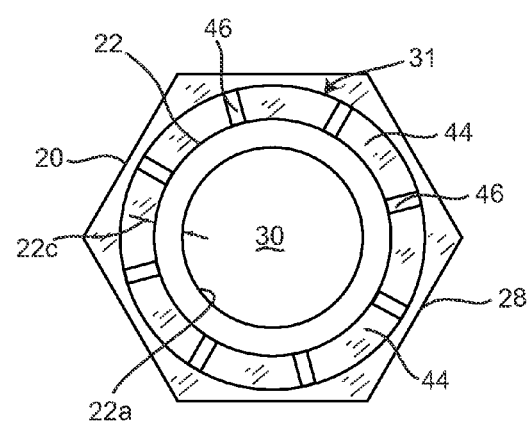
FIG. 6 is a view of the bottom of the nut as seen along line 6-6 of FIG. 3.
Figure 7:
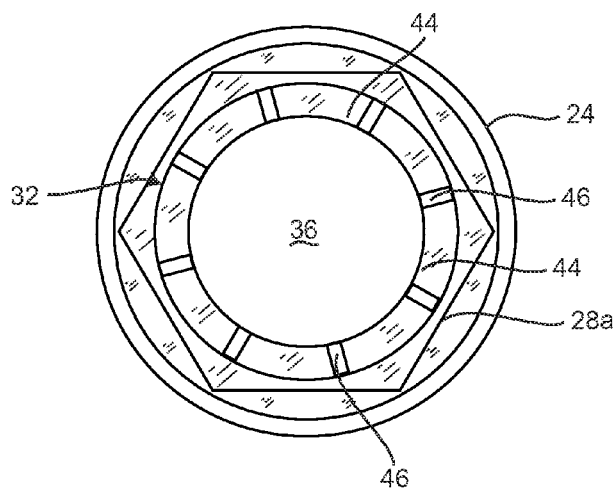
FIG. 7 is a view of the top of the washer.

Referring back to FIGS. 6-8, each camming end surface 31, 32 comprises a plural number of circumferentially-spaced flat ramps 44, and a corresponding number of interconnecting flat shoulders 46. In the illustrated construction, each end face has eight slightly sloped ramps 44 and the same number of steeply sloped shoulders 46. Both the ramps and the shoulders are inclined in the direction of the nut's rotational axis.

The slope angle of each ramp 44 is approximately eight degrees, and the slope angle of each shoulder 46 is approximately forty-five degrees. The term "slope angle" designates the angle that the respective cam surface (44 or 46) makes with respect to an imaginary radial plane extending normal to the rotational axis 34 of the shank and the fastener assembly. Numeral 48 represents the slope angle of each ramp 44; and numeral 50 represents the slope angle of each flat shoulder 46.

Figure 8:
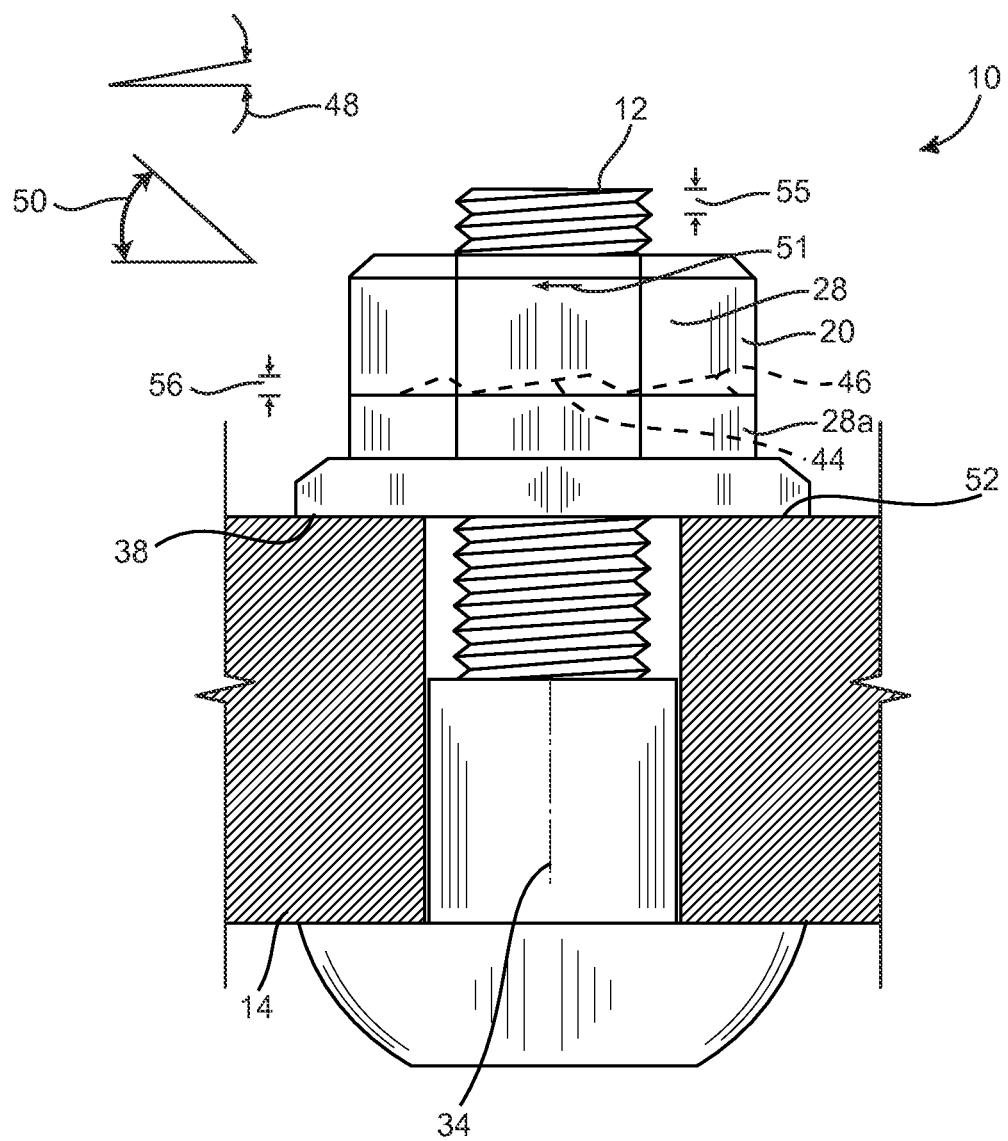
FIG. 8 is a side partial sectional view of the fastener on a stud and workpiece.
Figure 9:
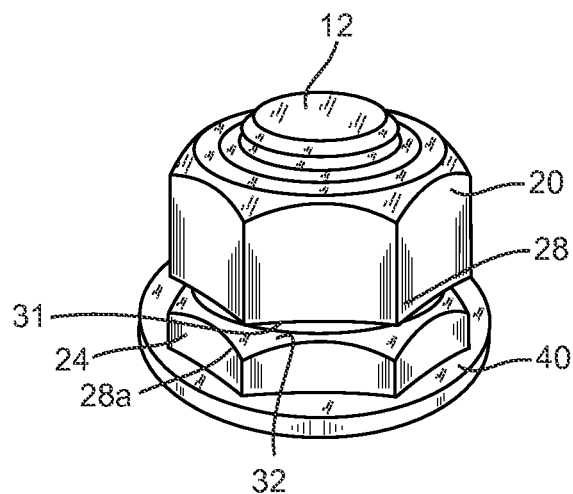
FIG. 9 is a perspective view of the fastener on a stud.

Shoulders 46 and ramps 44 in each camming surface are connected at acute angles, so that the respective cam surface has a continuous, uninterrupted undulating contour. There are no obstructions or ledges preventing relative rotation between the nut and lock washer when the cammed surfaces are inter-engaged, as shown in FIG. 8. It should be appreciated that a greater or lower number of ramps and shoulders can be used than those shown in the FIGs.

In the preferred embodiment, the low-profile height of the combined nut and washer necessitates that a conventional tool, such as wrench 16, will engage both radially outer surfaces 28 and 28a. Nut 20 is threaded onto stud 12 by rotating the nut in the clockwise direction indicated by arrow 51 (FIGS. 1 and 8). During the nut-tightening operation, the bottom flat face 38 on the washer becomes frictionally anchored to surface 52 on the associated workpiece. Further rotation of the nut in the arrow 51 direction causes the shoulders on the nut to push shoulders 46 on the washer until the nut is fully tightened.

As shown in FIG. 2, when the nut is rotated in the loosening or counter-clockwise direction, shown by arrow 53, either by vibration or deliberately, the ramps on the nut slide up the ramps on the washer. The nut moves to a wedged, locked position between the washer ramps and the threads on stud 12. The lock action is enhanced by the fact that the axial thickness dimensions of shoulders 46 is less than the thread pitch distance of the threads on stud 12 and nut 20. In the drawings, numeral 55 represents the thread pitch distance, whereas numeral 56 represents the axial thickness dimensions of shoulders 46.

Typically, the threads on the stud and nut comprise between 10 to 20 threads per inch, which provides a thread pitch distance 55 of about 0.10" to 0.05". The cam surfaces on the nut and the lock washer will, in such case, have a shoulder axial thickness dimension greater than 0.05", preferably about 0.07" for fine threads and greater than 0.10", preferably 0.12" for coarse threads. The shoulder axial thickness dimension 56 is related to the thread pitch dimension, so that dimension 56 is greater than dimension 55.

Figure 10:
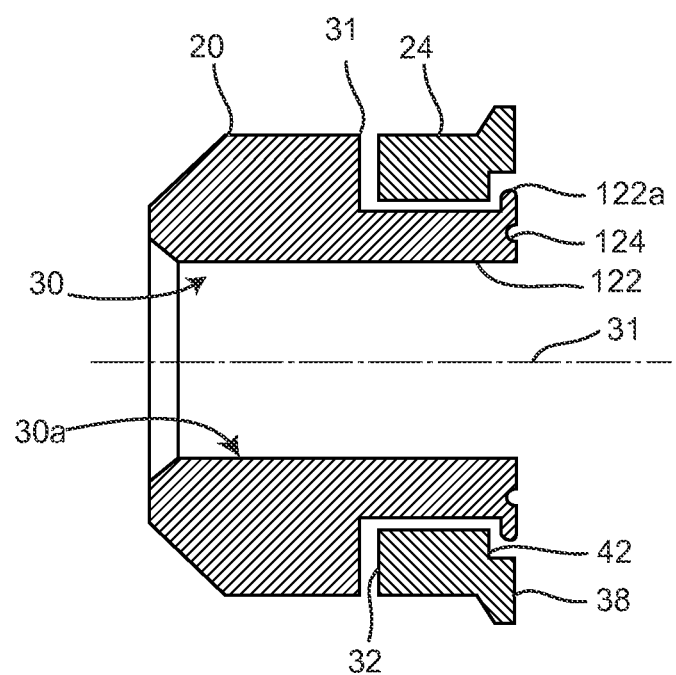
FIG. 10 is a sectional view showing an alternate embodiment of the nut and washer assembly.

In an alternate embodiment of the fastener, shown in FIG. 10, and denoted 110, the skirt 122 is elongated to span almost the entire height of the washer 24, thereby increasing the number of threads in the fastener 110. In this manner, for example, coarser thread-types may be used while providing a sufficient number of threads for proper torque-setting of the fastener to the stud.

In the embodiment illustrated, the bottom edge 122*a* of the skirt includes an annular channel 124. Channel 124 allows only the radially outer-most edge of skirt 122 to be flared out to retain washer 24, thereby accommodating the increased thickness of skirt 122.

Nut and washer dimensions are known in the art. According to standards known in the art, an exemplary 3/8 inch hex nut includes a nominal thickness of 21/64 inches thickness. According to standards known in the art and supplied by the Nord Lock® company, an exemplary pair of locking washers configured for a 3/8 inch bolt and nut includes a thickness of 2.5 mm and an outer diameter of 16.6 mm. An exemplary combination of a standard 3/8 inch nut and an exemplary standard 3/8 inch locking washer combination would include an overall height to washer diameter ratio of (21/64 inches*25.4 mm/inch)+2.5 mm/16.6 mm=0.65. One having skill in the art will appreciate that a standard nut and locking washer combination including a height to washer diameter ratio of 0.65 includes a higher ratio than a low-profile cam locking fastener assembly with a ratio of combined height to said radially outermost diameter of less than 0.54 as disclosed herein.

From the foregoing description, one skilled in the art will readily recognize that the present invention is directed to a low-profile self-tightening fastener. While the present invention has been described with particular reference to various preferred embodiments, one skilled in the art will recognize from the foregoing discussion and accompanying drawings that changes, modifications, and variations can be made in the present invention without departing from the spirit and scope thereof as is more fully delineated in the following claims.

The invention claimed is:

1. A low-profile cam locking fastener assembly for coacting with an externally threaded member to apply a tightening force to a workpiece, comprising:
   a nut comprising:
      an internal opening formed about an axis, the internal opening having a first inner surface;
      a bottom cam face that is perpendicular to said axis; and
      a tubular skirt that projects from the bottom cam face, the skirt having an cylindrical inner bore having a second inner surface that is contiguous with the first inner surface, wherein said first and second inner surfaces have a continuous threading that is complementary to a threaded profile of the threaded member;
   a locking washer having a central opening and an upper cam face, wherein said skirt is telescopically received within said central opening; and
   camming means on said nut cam face and said washer cam face, for driving both the nut and the locking washer when the nut is rotated in a tightened direction on said threaded member and for wedging said nut in a locked position when said nut begins to rotate in the direction opposite to the tightened direction;
   wherein said nut and locking washer have a certain combined height and said locking washer has a radially outmost diameter, wherein a ratio of said combined height to said radially outermost diameter is less than 0.54, such that said nut and locking washer can be used in low-profile application where a nut and washer with a standard ratio cannot be used.

2. A low-profile cam locking fastener assembly as defined in claim 1, wherein the threaded profile has a certain pitch and the skirt has a wall thickness that is approximately 1.75 times said pitch.

3. A low-profile cam locking fastener assembly as defined in claim 1, wherein said skirt is flared radially outwardly at the end opposite to the bottom cam face, said central opening of the locking washer coacting with the flared end to maintain said locking washer connected loosely with said nut.

4. A low-profile cam locking fastener assembly as defined in claim 1, further comprising external drive means on both said nut and said locking washer, whereby said nut and said locking washer can be tightened and loosened by application of an appropriate tool to both of said external drive means simultaneously.

5. A low-profile cam locking fastener assembly as defined in claim 1, wherein said locking washer has a workpiece engaging bottom surface and said skirt extends into said central opening terminating proximate to said bottom surface.

6. A low-profile cam locking fastener assembly for coacting with an externally threaded member to apply a tightening force to a workpiece, comprising:
   a nut comprising:
      a body having an external drive means for rotating the fastener about an axis in either a first direction for tightening the nut against the workpiece and in the opposite direction for loosening the nut from the workpiece;
      an internal opening formed in said body about said axis, the internal opening having a first inner surface;
      the body having a bottom cam face that is perpendicular to said axis; and
      a tubular skirt that projects from the bottom cam face, the skirt having an cylindrical inner bore having a second inner surface that is contiguous with the first inner surface, wherein said first and second inner surfaces have continuous threading that is complementary to a threaded profile of the threaded member;
   a locking washer having a central opening and an upper cam face, wherein said skirt is telescopically received within said central opening; and
   camming means on said nut cam face and said washer cam face, for driving both the nut and the locking washer when the nut is rotated in a tightened direction on said threaded member and for wedging said nut in a locked position when said nut begins to rotate in the direction opposite to the tightened direction;
   wherein said nut and locking washer have a certain combined height and said locking washer has a radially outmost diameter, wherein a ratio of said combined height to said radially outermost diameter is less than 0.54, such that said nut and locking washer can be used in low-profile application where a nut and washer with a standard ratio cannot be used.

7. A low-profile cam locking fastener assembly as defined in claim 6, wherein the continuous threading has a certain pitch and the skirt has a wall thickness that is approximately 1.75 times said pitch.

8. A low-profile cam locking fastener assembly as defined in claim 6, wherein said skirt is flared radially outwardly at the end opposite to the bottom cam face, said central opening of the locking washer coacting with the flared end to maintain said locking washer connected loosely with said nut.

9. A low-profile cam locking fastener assembly as defined in claim 6, wherein said locking washer has a workpiece engaging bottom surface and said skirt extends into said central opening terminating proximate to said bottom surface.

10. A low-profile cam locking fastener assembly as defined in claim 6, wherein said locking washer includes external driving means which is adapted to be engaged simultaneously with the external drive means of the nut by an appropriate tool.

11. A low-profile cam locking fastener assembly for releasably applying a load to a workpiece, comprising:
   a nut comprising:
      a body having a bottom cam face and an external drive means for rotating the fastener about an axis in either a first direction for tightening the nut against the workpiece and in the opposite direction for loosening the nut from the workpiece, wherein the bottom cam face is perpendicular to said axis;
      an internal opening formed in said body about said axis, the internal opening having a first inner surface; and
      a tubular skirt that projects from the bottom cam face, the skirt having a cylindrical inner bore having a second inner surface that is contiguous with the first inner surface, wherein said first and second inner surfaces have continuous threading that is complementary to a threaded profile on a threaded member; a locking washer having an central opening and an upper cam face, wherein said skirt is telescopically received within said central opening;
   camming means on said nut cam face and said washer cam face, for driving both the nut and the locking washer when the nut is rotated in a tightened direction on said threaded member and for wedging said nut in a locked position when said nut begins to rotate in the direction opposite to the tightened direction; and
   wherein the skirt and the locking washer have inter-engaging means for preventing separation of the locking washer from the skirt;
   wherein said nut and locking washer have a certain combined height and said locking washer has a radially outmost diameter, wherein a ratio of said combined height to said radially outermost diameter is less than 0.54, such that said nut and locking washer can be used in low-profile application where a nut and washer with a standard ratio cannot be used.

12. A low-profile cam locking fastener assembly as defined in claim 11, wherein the continuous threading has a certain pitch and the skirt has a wall thickness that is approximately 1.75 times said pitch.

13. A low-profile cam locking fastener assembly as defined in claim 11, wherein said inter-engaging means comprises the skirt being flared radially outwardly at the end opposite to the bottom cam face and said central opening of the locking washer coacting with the flared end to maintain said locking washer connected loosely with said nut.

14. A low-profile cam locking fastener assembly as defined in claim 11, wherein said locking washer has a workpiece engaging bottom surface opposite to the upper cam face and said skirt extends into said central opening terminating proximate to said bottom surface.

15. A low-profile cam locking fastener assembly as defined in claim 1, wherein said locking washer includes external driving means which is adapted to be engaged simultaneously with the external drive means of the nut by an appropriate tool.

\* \* \* \* \*